US012458898B2

(12) United States Patent
Rell (10) Patent No.: US 12,458,898 B2
(45) Date of Patent: Nov. 4, 2025

(54) ATTRACTION CONTROL SYSTEM AND METHOD USING MULTILAYER PERCEPTRON NEURAL NETWORKS AND MACHINE LEARNING

(71) Applicant: Universal City Studios LLC, Universal City, CA (US)

(72) Inventor: Gregory Rell, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 656 days.

(21) Appl. No.: 17/931,390

(22) Filed: Sep. 12, 2022

(65) Prior Publication Data

US 2024/0082743 A1  Mar. 14, 2024

(51) Int. Cl.
*A63G 31/00* (2006.01)
*G06N 5/022* (2023.01)
*G06N 20/00* (2019.01)

(52) U.S. Cl.
CPC .............. *A63G 31/00* (2013.01); *G06N 5/022* (2013.01); *G06N 20/00* (2019.01)

(58) Field of Classification Search
CPC . A63G 31/00; A63G 1/34; A63G 1/00; G06N 5/022; G06N 20/00; G06N 20/10; G06N 20/20
USPC .......................................................... 472/43
See application file for complete search history.

(56) References Cited

U.S. PATENT DOCUMENTS

| 8,369,992 B2 | 2/2013 | Barajas et al. |
| 9,079,305 B2 | 7/2015 | Williamson et al. |
| 9,489,623 B1 | 11/2016 | Sinyavskiy et al. |
| 9,643,318 B2 | 5/2017 | Wang et al. |
| 10,238,979 B2 | 3/2019 | Boyle et al. |
| 10,429,841 B2 | 10/2019 | Yang et al. |
| 11,420,578 B2 * | 8/2022 | Krauthamer ........... A63G 31/00 |
| 2018/0229115 A1 | 8/2018 | Lee |
| 2018/0276912 A1 | 9/2018 | Zhou |

(Continued)

FOREIGN PATENT DOCUMENTS

| CN | 114130038 A | 3/2022 |
| EP | 3878529 A1 | 9/2021 |
| WO | 2021261055 A1 | 12/2021 |

OTHER PUBLICATIONS

International Standard, ISO 13849-1, Safety of machinery—Safety-related parts of control systems, Dec. 15, 2015, pp. 1-96, Third edition, Published in Switzerland.

(Continued)

*Primary Examiner* — Laura K Tso (74) *Attorney, Agent, or Firm* — Fletcher Yoder, P.C.

(57) ABSTRACT

A controller is used to provide a dynamic ride profile for a ride system. The controller is used to access a data set indicative of conditions in an environment of the ride system in response to an alert indicative of a hindrance for the ride system in the environment. The controller is used to determine a classification from a plurality of classifications for the environment, via a predictive engine trained using supervised machine learning, based on the data set and a ride profile of the ride system. The controller is used to determine one or more recommendations, via the predictive engine, based on the data set and the classification and visually or audibly presenting the classification with the one or more recommendations.

20 Claims, 5 Drawing Sheets

(56) References Cited

U.S. PATENT DOCUMENTS

2019/0201806 A1    7/2019  Weston
2022/0054948 A1    2/2022  Yeh et al.
2023/0213925 A1*   7/2023  Jeromin .............. G05B 23/024
                                                      700/29

OTHER PUBLICATIONS

Choi, Hyun-Chul, Realtime Facial Expression Recognition using Active Appearance Model and Multilayer Perceptron, Oct. 18-21, 2006, pp. 1-4.
Mubarek, Aji Mubalaike, Multilayer Perceptron Neural Network Technique for Fraud Detection, 2nd International Conference on Computer Science and Engineering (UBMK), Oct. 1, 2017, pp. 1-6.
Bhoyar, Sakshi, Heart Disease Prediction System using Multilayer Perceptron, 2nd International Conference for Emerging Technology (INCET), May 21-23, 2021, pp. 1-4.
International Standard, IEC 61508-1, Functional Safety of Electrical/Electronic/Programmable Electronic Safety-Related Systems, Apr. 2010, pp. 1-132, Edition 2.0, Published in Switzerland.
Kirmani, Mudasir M., Heart Disease Prediction using Multilayer Perceptron Algorithm, International Journal of Advanced Research in Computer Science, May-Jun. 2017, pp. 1-5, vol. 8, No. 5.
PCT/US2023/032323 International Search Report and Written Opinion mailed Jan. 2, 2024.

* cited by examiner

ATTRACTION CONTROL SYSTEM AND METHOD USING MULTILAYER PERCEPTRON NEURAL NETWORKS AND MACHINE LEARNING

BACKGROUND

The present disclosure relates generally to the field of amusement parks. More specifically, embodiments of the present disclosure relate to methods and equipment used in conjunction with amusement park games, shows, or rides.

Amusement parks typically include various attractions that provide unique experiences for guests. For example, an amusement park may include various rides and show performances. As technology has continued to improve, such attractions have increased in sophistication and complexity. For instance, certain rides may provide an immersive experience for the visitor, e.g., a series of vehicles may drive riders through rooms with various features, including audio, video, and special effects features. With the increasing sophistication and complexity of modern ride attractions and show performances, and the corresponding increase in expectations among theme or amusement park patrons, improved and more creative monitoring and controlling systems are needed for the amusement parks.

In addition, ride systems or show performances may include complicated systems such as multi axis robots, hydraulic and electrically powered motion bases, transport platforms, and custom assemblies that have rapid modes of operation. Traditional techniques employed to monitor the ride systems or show performances have very rigid operating requirements and very difficult methods of testing. It is now recognized that it is desirable to have dynamic or changing operating environments for the ride systems or show performances.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a controller for a ride system for providing a dynamic ride profile is provided in accordance with the present disclosure. The controller includes a processor and a memory. The memory includes instructions stored thereon which, when executed by the processor, cause the processor to perform operations including accessing a data set indicative of conditions in an environment of the ride system in response to an alert indicative of a hindrance for the ride system and determining a classification from a plurality of classifications for the environment, via a predictive engine trained using supervised machine learning, based on the data set and a ride profile of the ride system. The operations further include determining one or more recommendations, via the predictive engine, based on the data set and the classification and visually or audibly presenting the classification with the one or more recommendations.

In an embodiment, a method for providing a dynamic ride profile for a ride system is provided in accordance with the present disclosure. The method includes accessing, via a processor, a data set indicative of conditions in an environment of the ride system in response to an alert indicative of a hindrance for the ride system and determining a classification from a plurality of classifications for the environment, via a predictive engine trained using supervised machine learning, based on the data set and a ride profile of the ride system. The method further includes determining one or more recommendations, via the predictive engine, based on the data set and the classification and visually or audibly presenting the classification with the one or more recommendations.

In an embodiment, a ride system for providing a dynamic ride profile is provided in accordance with the present disclosure. The ride system includes a ride vehicle riding in an environment, and the ride vehicle includes an onboard sensor configured to gather vehicle data from the ride vehicle. The ride system also includes a dynamic element disposed within the environment and an offboard sensor disposed outside of the ride vehicle to gather dynamic element data indicative of at least one aspect of the dynamic element. The ride system includes a controller. The controller includes one or more processors and a memory. The memory includes instructions stored thereon which, when executed by the one or more processors, cause the one or more processors to perform operations including accessing a data set indicative of conditions in an environment of the ride system in response to an alert indicative of a hindrance for the ride system and determining a classification from a plurality of classifications for the environment, via a predictive engine trained using supervised machine learning, based on the data set and a ride profile of the ride system. The operations further include determining one or more recommendations, via the predictive engine, based on the data set and the classification and visually or audibly presenting the classification with the one or more recommendations.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Present embodiments are directed to dynamic systems for analyzing and responding to conditions in an attraction. A dynamic system in accordance with present embodiments may be layered with a profile evaluation system (e.g., a lookup table for analyzing a ride profile) to facilitate analysis and operation to obtain more desirable outcomes. Specifically, the dynamic system may override an initial assessment based on a profile evaluation system under certain circumstances. This can be particularly useful in attraction systems that allow for user input and selection of options throughout an attraction sequence, such as a ride that allows the rider to guide a ride vehicle. For example, a lookup table for a ride profile (e.g., this may include multiple tables that vary based on rider size, preference, age) may be used to make determinations about how certain aspects of a ride system should operate based on ongoing input (e.g., sensor data). As a specific example, when conditions outside of the ride profile are detected in a user-guided ride, corrections may be instructed by the profile evaluation system based on exceeding the ride profile. However, in some situations, it may be desirable to continue without making such corrections. Specifically, for example, if a bird is detected as entering the ride path for a vehicle on a dark ride, this may be identified by the profile evaluation system as an event that extends beyond the ride profile and the initial response may be to shut down the ride. However, a second dynamic layer of analysis may be provided in accordance with present embodiments that allows the system to override this initial response such that the ride can continue with slight modification or no modification to avoid interfering with the ride experience. Additional details of operation will be discussed below.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As used herein, the terms "connect," "connection," "connected," "in connection with," and "connecting" are used to mean "in direct connection with" or "in connection via one or more elements." Further, the term "set" is used to mean "one element" or "more than one element." Further, the terms "couple," "coupling," "coupled," "coupled together," and "coupled with" are used to mean "directly coupled together" or "coupled together via one or more elements."

In addition, as used herein, the terms "real time," "real-time," or "substantially real time" may be used interchangeably and are intended to describe operations (e.g., computing operations) that are performed without any human-perceivable interruption between operations. For example, as used herein, data relating to the systems described herein may be collected, transmitted, and/or used in control computations in "substantially real time," such that data readings, data transfers, and/or data processing steps occur once every second, once every 0.1 second, once every 0.01 second, or even more frequently, during operations of the systems (e.g., while the systems are operating). In addition, as used herein, the terms "continuous," "continuously," or "continually" are intended to describe operations that are performed without any significant interruption. For example, as used herein, control commands may be transmitted to certain equipment every five minutes, every minute, every 30 seconds, every 15 seconds, every 10 seconds, every 5 seconds, or even more often, such that operating parameters of the equipment may be adjusted without any significant interruption to the closed-loop control of the equipment. In addition, as used herein, the terms "automatic," "automated," "autonomous," and so forth, are intended to describe operations that are performed or are caused to be performed, for example, by a computing system (i.e., solely by the computing system, without human intervention). Indeed, although certain operations described herein may not be explicitly described as being performed continuously and/or automatically in substantially real time during operation of the computing system and/or equipment controlled by the computing system, it will be appreciated that these operations may, in fact, be performed continuously and/or automatically in substantially real time during operation of the computing system and/or equipment controlled by the computing system to improve the functionality of the computing system (e.g., by not requiring human intervention, thereby facilitating faster operational decision-making, as well as improving the accuracy of the operational decision-making by, for example, eliminating the potential for human error), as described in greater detail herein.

It has become more common to create elaborate environments in amusement parks, which include scenery, special effects, audiovisual features, and other media elements that improve a visitor's experience. A visitor walks or rides (e.g., on a ride vehicle) into an environment (e.g., a show performance or an attraction) and may be interactive with the environment or have immersive experience in the environment. To keep the visitor's experience above a standard level and/or to address other issues related to the visitor's experience in the amusement parks (e.g., safety), the amusement parks may be operated under certain standards. When the operation of a ride system or an environment is not meeting corresponding standard(s), alerts may be transmitted to the visitor and a control system of the environment, such as to inform the visitor to exit the environment or change their route, shut down one or more elements in the environment, and the like. Due to the entertainment nature of the amusement parks, these operation standards may be different for different environments, different ride systems, and/or different visitors (e.g., visitors having different heights, weights, ages, and so forth) to accommodate individual visitor's desires for experiencing the amusement parks.

In accordance with present embodiments, ride profiles may be used to monitor and/or control the operation standards for certain rides. The ride profiles with respect to the various environments and/or ride systems of the amusement parks may be traditionally provided by ride designers or determined based on historical data (e.g., a golden profile (GP) in lookup tables, a CAM profile), and may be saved in a database. When the operation of an environment or a ride system is not within the ride profile of a visitor, alerts may be transmitted to the visitor or the environment for corresponding reactions, such as exiting the environment, changing the route of the ride, shutting down one or more elements in the environment, and the like. For example, in one embodiment, when the visitor is in an environment, the visitor's conditions may be monitored by sensors (e.g., distributed in the environment, on the ride vehicle, on a device attached to the visitor) and compared to the values of corresponding ride profile stored within the database. When the visitor's conditions is not within the corresponding ride profile, a trigger event may occur, and corresponding alerts may be transmitted for the visitor associated with the ride profile. For instance, the trigger even may be a software error that provides the wrong value and outputs an incorrect set point to an actuator in the environment, or the actuator malfunctions and attempts to move to an unexpected state (e.g., not in the ride profiles provided by the ride designers or in the historical data used to determine the ride profiles), which may cause the visitor's condition in the environment to fall outside the corresponding ride profile. Corresponding alerts may be transmitted for the visitor associated with the ride profile and request the visitor to exit the environment or change the route of the ride based on the ride profile associated with the visitor.

However, under some unexpected situation (e.g., not in the ride profiles provided by the ride designers or in the historical data used to determine the ride profiles), the operation standards associated with the ride profile for the visitor in particular situations (e.g., associated with different environments, different ride vehicles, and/or desired experiences) may not be accurate since it is determined based on historical data and/or ride designer's iterative approach to finalizing a desired ride profile. In particular, due to the entertainment nature of the amusement parks, the operation standards may be different for different environments, different ride systems, and/or different visitors (e.g., visitors having different heights, weights, ages, and so forth). Accordingly, real time reevaluation of the visitor's conditions and determination of a dynamic ride profile may be desired to improve the visitor's experience in the amusement park (e.g., within a particular attraction). For example, in one embodiment, an alert may be transmitted for the visitor, which may request the visitor to exit the environment due to some hindrance in the environment. However, the predictive engine may determine that it is not necessary for the visitor to exit the environment and provide corresponding recommendations for the visitor, and the visitor's experience in the environment may not be interrupted. Accordingly, the present disclosure is related to determining a dynamic ride profile for a visitor in an environment of the amusement parks by using a multilayer perceptron ML (machine learning) model trained with labelled data. A multilayer perceptron model may be used to solve a real time classification problem that involves a small number of input features with high accuracy.

In accordance with present embodiments, a dynamic ride profile may be determined for an environment or a ride system of an amusement park. The dynamic ride profile may be determined based on the features or properties of a particular ride system (including the ride vehicle and environment). The dynamic ride profile may also be determined based on individual visitor's conditions (e.g., physical conditions, height, weight, age) and desire of experience (e.g., relaxing, thrilling, standard) for the amusement park or for a specific attraction (e.g., a specific ride). The dynamic ride profile may be different for different environments or different ride systems of the amusement park for the same visitor. The dynamic ride profile may be different for the same environments or same attractions of the amusement park for different visitors. For example, different sizes, ages, or preferences of visitors may correspond to different profiles.

As an example of how present embodiments may operate, we shall discuss a scenario in which a visitor walks or rides (e.g., on a ride vehicle) in an environment within a system using lookup tables provided by ride designers or determined based on historical data to monitor the visitor's ride profile. One or more sensors (e.g., motion sensor, position sensor, weight sensor, light sensor, sound sensor, image camera, radio frequency identification (RFID) sensor) may be distributed in one or more locations of the environment to monitor operations of the environment. In addition, there may be one or more elements in the environment, which may have one or more sensors installed to monitor the operations of the one or more elements. In addition, there may be one or more sensors monitoring conditions associated with the visitor in the environment. For instance, the one or more sensors may be installed on a device that is attached to the visitor (e.g., handheld devices, wearable devices, tags), or on the ride vehicle that the visitor is sitting in. A controller may be installed in the device or on the ride vehicle or in a control center to receive data from sensors monitoring conditions associated with the visitor, or operations of the environment, or operations of the one or more elements in the environment. The controller may analyze the data to evaluate conditions associated with the visitor, the operations of the environment, or the operations of the one or more elements in the environment. The controller may use the data to determine whether the visitor's conditions are meeting the corresponding standards associated with the visitor's ride profile stored in a lookup table. The controller may send out an alert when there is a hindrance (e.g., something detected on ride tracks, a software error, an input from a ride engineer) in the environment and the conditions of the visitor are not meeting the corresponding standards associated with the visitor's ride profile. The alert may include actions requesting the visitor to exit the environment or change to another route, or instructions for a control system of the environment to shut down or adjust operation of one or more elements in the environment. However, as explained above, some of the actions (e.g., to exit the environment) may not be necessary and may not be desired by the visitor.

In one embodiment, the controller may receive a trigger signal associated with the alert, which may initiate the controller to reevaluate the data using a predictive engine implementing multilayer perceptron models and may be trained using supervised machine learning to generate a dynamic ride profile. The predictive engine may provide recommendations associated with the alert based on the generated dynamic ride profile, which may be conflicting with the actions associated with the alert. For example, a recommendation provided by the predictive engine may allow the visitor to stay in the environment or the route while the alert includes actions requesting the visitor to exit the environment or change to another route, or allow the environment to continue operating instead of shutting down one or more elements in the environment. For example, the alert may be caused by some unexpected changes in the environment or elements in the environment (e.g., not in the ride profiles provided by the ride designers or in the historical data used to determine the ride profiles), which may be identified as not meeting the operation standards within the visitor's ride profile. However, the unexpected changes may not affect the visitor's overall experience in the environment, and requesting the visitor to exit the environment or change route or controlling (e.g., shutting down) one or more elements in the environment may not be necessary and sometimes may make the visitor's experience in the environment undesired. Accordingly, by employing the predictive engine to evaluate the unexpected changes using predictive models, the visitor may have a dynamic changing ride profile, which may be bigger or more relaxed compared to how it would have been before conducting the predictive models, and the visitor may have better experiences in the amusement parks.

In an embodiment, one or more additional effects may be employed to create additional experiences associated with the recommendations. The controller may operate additional devices or sensors and/or receive additional signals (e.g., by communicating through network) to work with the recommendations in order to improve a visitor's experience and support a particular narrative of the environment. For example, the recommendation may be associated with a part of a story or scene, and it may be controlled to operate in a pattern with other attractions in the amusement park. In some embodiments, when an issue with a ride profile not meeting a desired standard for a particular visitor is identified, an alternate experience may be provided in a seamless fashion to provide a desirable experience for the visitor.

Figure 1:
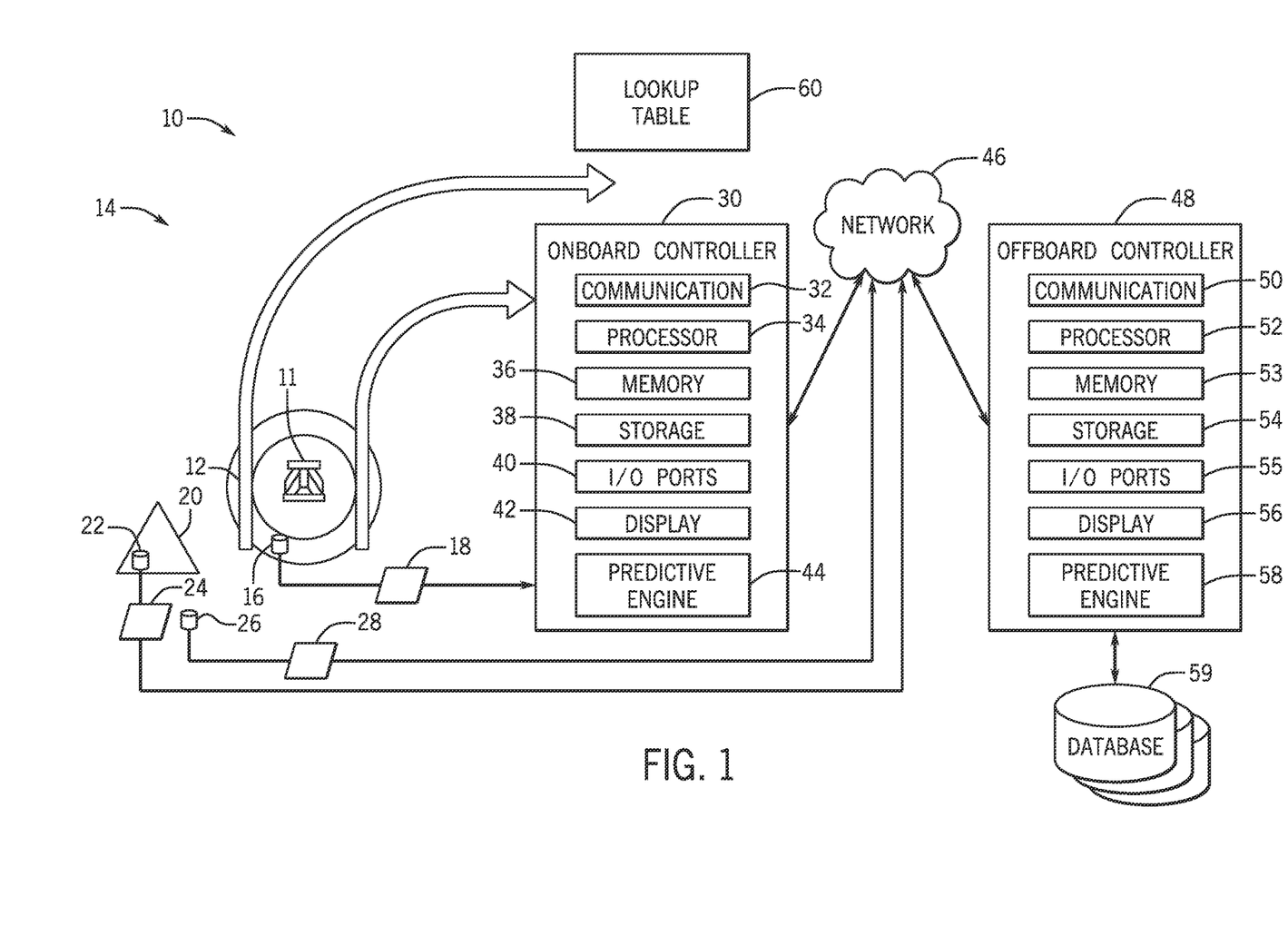
FIG. 1 is a schematic view of an embodiment of a riding system, in accordance with an embodiment of the present disclosure.

FIG. 1 is a block diagram of a system 10 that includes a visitor 11 traveling on a ride vehicle 12 in an environment 14. There may be an onboard sensor 16 (e.g., motion sensor, position sensor, weight sensor, light sensor, sound sensor, image sensor, camera, RFID sensor) installed or disposed on the ride vehicle 12 to gather vehicle data 18 from the ride vehicle 12, and the vehicle data 18 may include information (e.g., image data) associated with the visitor 11. The onboard sensor 16 may also collect data from the environment 14. There may be an element 20 disposed within the environment 14, and an element sensor 22 (e.g., motion sensor, position sensor, weight sensor, light sensor, sound sensor, image camera, RFID sensor) may be installed or disposed on the element 20 to gather element data 24 from the element 20. There may be an offboard sensor 26 (e.g., motion sensor, position sensor, weight sensor, light sensor, sound sensor, image camera, RFID sensor) installed or disposed in the environment 14 to monitor and gather environment data 28 from the environment 14. The offboard sensor 26 may collect data associated with the vehicle 12, the element 20, and/or other operating parameters of the environment 14. An onboard controller 30 may be installed on the vehicle 12 to receive and analyze data from the onboard sensor 16, the element sensor 22, and/or the offboard sensor 26.

The onboard controller 30 may include various types of components that may assist the onboard controller 30 in performing various types of computer tasks and operations. For example, the onboard controller 30 may include a communication component 32, a processor 34, a memory 36, a storage 38, input/output (I/O) ports 40, a display 42, a predictive engine 44 implementing multilayer perceptron machine learning model, and the like. The predictive engine 44 may utilize one or more predictive models to evaluate conditions of the visitor 11 in the environment 14 and determine a dynamic changing ride profile of the visitor 11. Various types of predictive models may be used to analyze the data from sensors (e.g., onboard sensor 16, element sensor 22, offboard sensor 26) and generate predictive outputs. The predictive engine 44 is trained with supervised machine learning technique, i.e., a predictive model is trained with training data that includes input data and desired predictive output (e.g., labelled dataset). The amount of training data that may be required to train a predictive model can be large.

The communication component 32 may be a wireless or wired communication component that may facilitate communication between the onboard controller 30 and various other controllers and devices via a network, the internet, or the like. For example, the communication component 32 may allow the onboard controller 30 to obtain data from various data sources, such as the vehicle data 18. The communication component 32 may use a variety of communication protocols, such as Open Database Connectivity (ODBC), TCP/IP Protocol, Distributed Relational Database Architecture (DRDA) protocol, Database Change Protocol (DCP), HTTP protocol, other suitable current or future protocols, or combinations thereof.

The processor 34 may process instructions for execution within the onboard controller 30. The processor 34 may include single-threaded processor(s), multi-threaded processor(s), or both. The processor 34 may process instructions stored in the memory 36. The processor 34 may also include hardware-based processor(s) each including one or more cores. The processor 34 may include general purpose processor(s), special purpose processor(s), or both. The processor 34 may be communicatively coupled to other internal components (such as the communication component 32, the storage 38, the I/O ports 40, and the display 42).

The memory 36 and the storage 38 may be any suitable articles of manufacture that can serve as media to store processor-executable code, data, or the like. These articles of manufacture may represent computer-readable media (e.g., any suitable form of memory or storage) that may store the processor-executable code used by the processor 34 to perform the presently disclosed techniques. As used herein, applications may include any suitable computer software or program that may be installed onto the onboard controller 30 and executed by the processor 34. The memory 36 and the storage 38 may represent non-transitory computer-readable media (e.g., any suitable form of memory or storage) that may store the processor-executable code used by the processor 34 to perform various techniques described herein. It should be noted that non-transitory merely indicates that the media is tangible and not a signal.

The I/O ports 40 may be interfaces that may couple to other peripheral components such as input devices (e.g., keyboard, mouse), sensors, input/output (I/O) modules, and the like. The display 42 may operate as a human machine interface (HMI) to depict visualizations associated with software or executable code being processed by the processor 34. In one embodiment, the display 42 may be a touch display capable of receiving inputs from an operator of the onboard controller 30. The display 42 may be any suitable type of display, such as a liquid crystal display (LCD), plasma display, or an organic light emitting diode (OLED) display, for example. Additionally, in one embodiment, the display 42 may be provided in conjunction with a touch-sensitive mechanism (e.g., a touch screen) that may function as part of a control interface for the onboard controller 30.

It should be noted that the components described above with regard to the onboard controller 30 are examples and the onboard controller 30 may include additional or fewer components relative to the illustrated embodiment.

Further, the system 10 may include network features that facilitate data communication within the system 10 and with exterior devices. For example, data (e.g., image data, video data, sound data, location data, and weight data) collected by sensors (e.g., the onboard sensor 16, the element sensor 22, the offboard sensor 26) may be transmitted to the onboard controller 30 through a network 46. Further, external data (e.g., data about a particular user, local weather/news) may be gathered from a remote system and transmitted to the onboard controller 30 via the network 46. However, in some embodiments, the data collected by sensors may be transmitted directly from the sensors (e.g., the onboard sensor 16, the element sensor 22, the offboard sensor 26) to the onboard controller 30. Indeed, the onboard controller 30 may communicate with the sensors or other devices directly and/or through the network 46 in accordance with present embodiments.

An offboard controller 48 may be located in a place other than the vehicle 12 (e.g., a control center of the amusement parks), and the offboard controller 48 may include various types of components that may assist the offboard controller 48 in performing various types of computer tasks and operations. The offboard controller 48 may include components similar to those included in the onboard controller 30. For example, the offboard controller 48 may include a communication component 50, a processor 52, a memory 53, a storage 54, input/output (I/O) ports 55, a display 56, a predictive engine 58 similar to the predictive engine 44, and the like.

The offboard controller 48 may receive and analyze data from the onboard sensor 16, the element sensor 22, and/or the offboard sensor 26. The data (e.g., image data, video data, sound data, location data, and weight data) collected by the sensors (e.g., the onboard sensor 16, the element sensor 22, the offboard sensor 26) may be transmitted to the offboard controller 48 through the network 46. Further, the external data (e.g., data about a particular visitor, local weather/news) gathered from the remote system may be transmitted to the offboard controller 48 via the network 46. However, in some embodiments, the data collected by the sensors may be transmitted directly from the sensors (e.g., the onboard sensor 16, the element sensor 22, the offboard sensor 26) to the offboard controller 48. Indeed, the offboard controller 48 may communicate with the sensors or other devices directly and/or through the network 46 in accordance with present embodiments. The offboard controller 48 may also communicate with a database 59, which may store information associated with the attractions in the amusement parks (e.g., the environment 14) and/or particular guests. The database 59 may be used to store the external data.

In one embodiment, the onboard controller 30 and/or the offboard controller 48 may analyze the data collected by the sensors (e.g., the onboard sensor 16, the element sensor 22, the offboard sensor 26) and/or the external data (e.g., data about the visitor 11 on the vehicle 12, local weather/news) to evaluate conditions associated with the vehicle 12, the operations of the environment 14, or the operations of the elements in the environment 14. The onboard controller 30 and/or the offboard controller 48 may determine measured conditions for the visitor 11 with the vehicle 12 (or without the vehicle 12 in some embodiments) and compare the measured conditions to a lookup table 60, saved in the onboard controller 30 and/or the offboard controller 48, that defines corresponding ride profile for the visitor 11 having acceptable operating condition ranges (e.g., taking into account guest physical characteristics, preferences, and the like). The onboard controller 30 and/or the offboard controller 48 may send out an alert when there is a hindrance (e.g., something detected on ride tracks or an attraction route, a software error, an input from a ride engineer) in the environment 14 and the measured conditions for the visitor 11 are not meeting the corresponding standards associated with the ride profile of the visitor 11. For example, the onboard controller 30 and/or the offboard controller 48 may be alerted to a ride vehicle that is traveling too slowly for a particular visitor's preferences. The alert may include instructions for the visitor 11 (e.g., change a route, buckle a restraint, stay seated, or exit the environment 14), control certain features (e.g., shut down one or more elements (e.g., element 20) in the environment 14, speed up the ride vehicle 12), guidance for an operator (e.g., adjust rider parameters, communicate with the guest), or the like.

Figure 2:
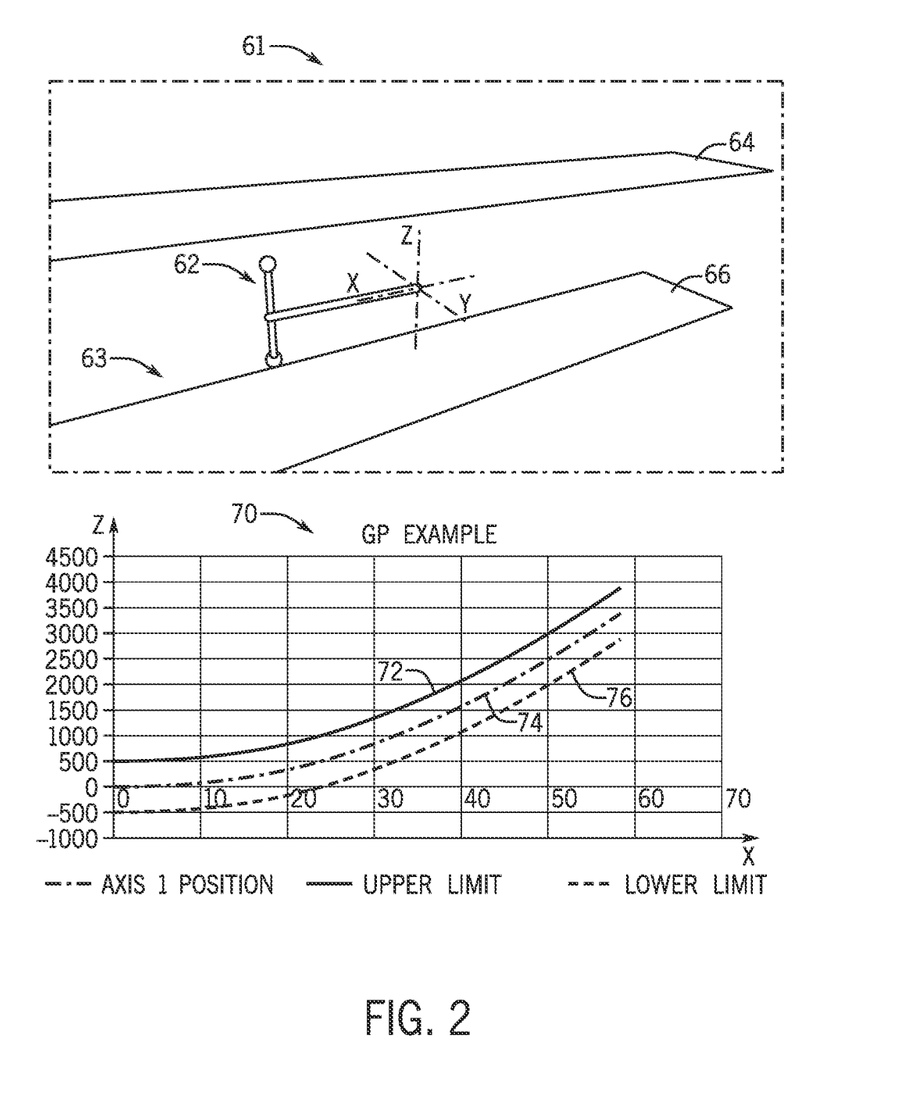
FIG. 2 is a schematic perspective view and associated graph of an embodiment of a simulated object in its ride profile, in accordance with an embodiment of the present disclosure.
Figure 3:
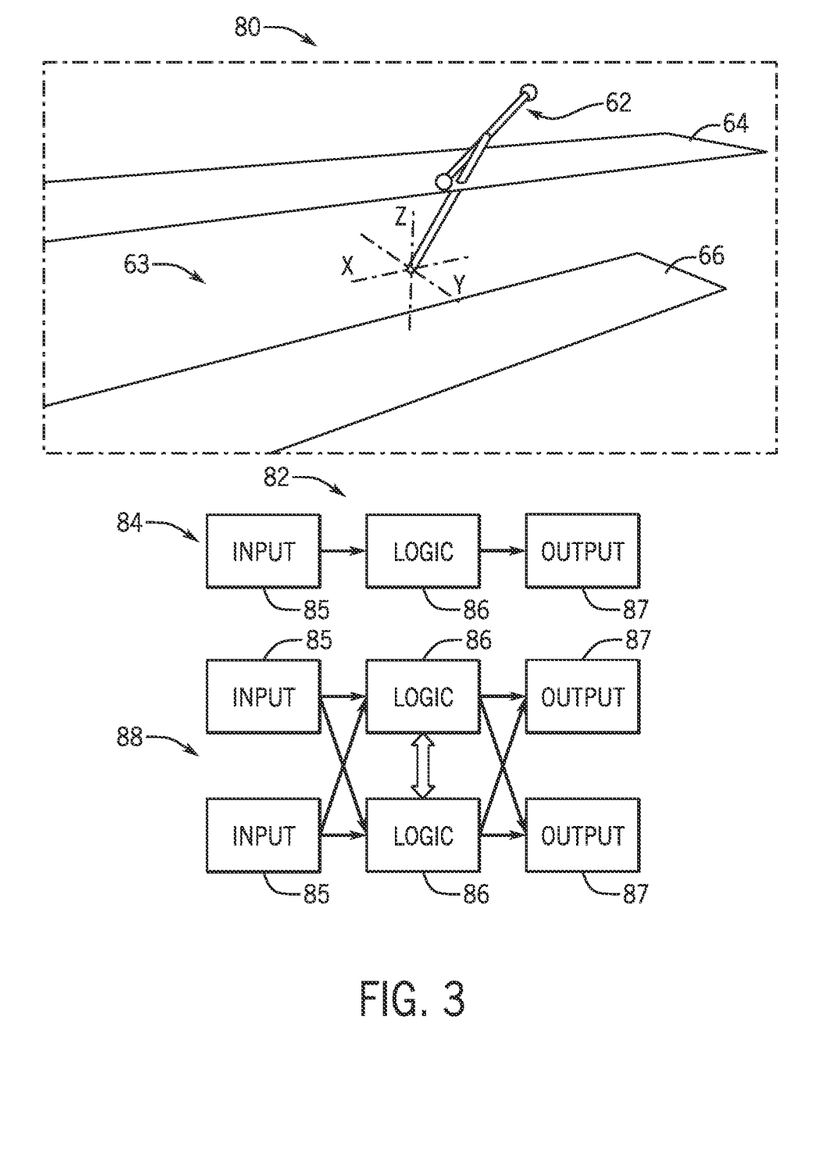
FIG. 3 is a schematic perspective view of an embodiment of a simulated object out of its ride profile and associated logic diagram, in accordance with an embodiment of the present disclosure.

In FIG. 2, a diagram 61 illustrates an object 62 moving in a space with a coordinate axis system XYZ. The object 62 is positioned within a ride profile 63 having acceptable operating conditions/positions between a first boundary surface 64 and a second boundary surface 66. These are not physical surfaces but represent edges or boundaries of a volume within which the object 62 is allowed or expected to travel. When the object 62 moves between the first boundary surface 64 and the second boundary surface 66, i.e., its expected operating range, the object 62 is inside of its ride profile 63 (e.g., golden profile (GP)). When the object 62 moves out of the first boundary surface 64 or the second boundary surface 66, the object 62 is out of its ride profile 63, as is illustrated in FIG. 3. As previously noted, the ride profile 63 may vary based on conditions. As an example, the first boundary surface 64 and the second boundary surface 66 may be closer together for a tall rider than for a short rider because physical characteristics of the rider may be taken into account.

A graph 70 in FIG. 2 illustrates relative positions of the first boundary surface 64, the object 62, and the second boundary surface 66. A curve 72 in the graph 70 shows positions of the first boundary surface 64 on XZ plane, a curve 74 shows positions of the object 62 on XZ plane, and a curve 76 shows the positions of the second boundary surface 66 on XZ plane. In an embodiment, the boundary surfaces 64, 66 may change with positioning of the object 62, as illustrated by the curve 72 and the curve 76 in the graph 70. The ride profile 63 of the object 62 limits the positions of the object 62 to be between the first boundary surface 64 and the second boundary surface 66, accordingly, the curve 74 is between the curve 72 and the curve 76, indicating that the object 62 is positioned within tolerances. The ride profile 63 of the object 62 may be determined by implementing lookup tables or utilizing machine learning algorithms trained by historical data or other identifying techniques using data sets collected by sensors used to detect conditions of the object 62 and its environment to evaluate conditions associated with the object 62. When the object 62 moves out of its ride profile 63, instructions may be provided by looking into the lookup tables or based on outcomes of the machine learning algorithms. For instance, the lookup tables may include mappings between positions of the object 62 and corresponding notifications of the positions. The notifications of the positions of the object 62 may indicate whether the object 62 is inside its ride profile 63 or outside its ride profile 63, and may also include corresponding instructions for the object 62 to avoid being out of its ride profile 63. For example, when the object 62 is outside of its ride profile 63, the instructions may include requests or alerts asking that the object 62 be moved back to its ride profile 63. While only two boundary surfaces (e.g., surfaces 64, 66) are illustrated in FIG. 2, it should be noted that the object 62 may have more than two boundary surfaces defining limits of its ride profile 63. It should also be noted that the boundary surfaces may be different for different visitors/vehicles due to accommodation of individual visitor's personal conditions (e.g., physical characteristics) and desired experience types, vehicle features and properties of the vehicle 12, and/or the like.

FIG. 3 illustrates an embodiment in which the object 62 has moved out of its ride profile 63 (or ride envelope). Specifically, a diagram 80 shows the object 62 has moved beyond the first boundary surface 64. In accordance with present embodiments, such a movement beyond the ride profile 63 causes corresponding instructions to be generated (e.g., via the onboard controller 30 or offboard controller 48). The instructions may cause the object 62 to be repositioned within the first boundary surface 64, cause presentation of a request to a user or operator to reposition the object 62, provide an alert indicating that the object 62 is outside of the ride profile 63, or the like. The ride profile 63 of the object 62 is an indicator and guide for keeping the object 62 inside a desired motion range when moving or relocating the object 62 to avoid issues (e.g., potential collisions) that may result is downtime or other undesirable events. In other words, the ride profile 63 of the object 62 may be used to keep the object 62 inside a certain space or to avoid undesired events due to walls and/or scenic props intruding into the ride envelope of the object 62 for a given environment in the amusement park. Again, it should be noted that the boundary surfaces may be moving with the object 62, as illustrated in the graph 70 of FIG. 2.

However, unexpected changes may occur to the object 62 and/or the surrounding environment (e.g., the environment 14), such as a hindrance (e.g., something detected near or in a path of the object 62, a software error, an input associated with the object 62). The lookup tables may not have a corresponding entry for the unexpected changes (e.g., due to the unexpected changes not having been considered in the lookup tables). Therefore, it is desired to have a dynamically changing ride profile in the time domain for the object 62.

In accordance with present embodiments, separately or supplemental to lookup tables, a predictive engine implementing a multilayer perceptron machine learning model may be employed using supervised machine learning to rapidly make one or more decisions based on unexpected changes. The predictive engine may utilize one or more predictive models to determine a dynamic changing ride profile of the object 62, and determine a classification from a plurality of classifications for the environment based on the dynamic changing ride profile of the object 62. For instance, the plurality of classifications may include some classifications indicating that the unexpected changes may cause the object 62 to be out of a threshold positional range, and some classifications indicating that the unexpected changes may not cause the object 62 to be out of the threshold positional range. The predictive engine may provide recommendations based on the classification.

A diagram 82 in FIG. 3 illustrates predictive modeling as performed by one or more controllers (e.g., the onboard controller 30) of the system 10, in accordance with present embodiments. Predictive modeling generally refers to computer-based techniques, algorithms, systems, and the like used to extract information from data to build models that can predict an output from a given input. For example, given certain measurements (e.g., from sensors), predictive modeling can predict a future outcome, which may be predicted to occur within a short period of time from when the measurements were obtained. In the diagram 82, a block diagram 84 illustrates using a single input 85, via a logic 86, to obtain a single output 87. Also in the diagram 82, a block diagram 88 illustrates using two inputs 85, which may be related via logics 86, to obtain two outputs 87, each of which may be affected by both of the two inputs 85. Various types of predictive models may be used to analyze data and generate predictive outputs. For a supervised machine learning technique, a predictive model is trained with training data that includes input data and desired predictive output (e.g., labelled dataset). The amount of training data that may be required to train a predictive model can be large.

Now referring again to FIG. 1, the vehicle 12 moves in the environment 14 similar to the object 62 moving along the XYZ coordinates in FIG. 2. Unexpected changes (i.e., not included in the lookup table 60) may occur to the visitor 11, the vehicle 12, the environment 14 (e.g., the element 20). Examples of unexpected changes may include mechanical wear (e.g., mechanical wear on the vehicle 12, the element 20, other elements in the environment 14), uncontrollable factors (e.g., weather, political or economic climates, earthquakes, hurricanes), unexpected operations of the vehicle 12, and/or any combinations of the above. Detection of such unexpected changes may cause the system 10 to generate instructions, alerts, and/or initiate actions. For example, in response to detection of an unexpected event, the onboard controller 30 or the offboard controller 48 or other controllers associated with the system 10 may operate to shut down one or more elements in the environment 14 (e.g., the element 20). As another example, the vehicle 12 may receive an alert indicative of the unexpected changes (e.g., a hindrance on a ride path) for the system 10. Such an alert may include a request that the visitor 11 on the vehicle 12 change to a different route or exit the environment 14.

Data and/or instructions related to an unexpected event may be generated by any of various aspects of the system 10. For instance, the vehicle 12 may receive an alert or instructions from the onboard controller 30, a feature of the environment 14, or the offboard controller 48, directly or through the network 46. The alert may be provided using various methods via lights, sound, vibrations, images, and the like. For example, speakers, lighting, haptics and the like on the vehicle 12, in the environment 14, or on a device (e.g., wearable devices, tags) carried by the visitor 11 may be utilized by the system 10 to provide the alert, instruction, or other communication.

Detection of an unexpected event may trigger the onboard controller 30 and/or the offboard controller 48 to employ one or more predictive engines to analyze the unexpected changes with the data collected by the sensors (e.g., the onboard sensor 16, the element sensor 22, the offboard sensor 26) and/or the external data (e.g., data about the visitor 11 on the vehicle 12, local weather/news) to evaluate conditions associated with the vehicle 12, the operations of the environment 14, or the operations of the elements in the environment 14. The predictive engines may evaluate the unexpected changes using one or more predictive models as described above and determine a dynamic changing ride profile of the visitor 11, which may be bigger or more relaxed compared to the one before conducting the predictive models. The predictive engine may determine a classification for the environment 14 with respect to the unexpected changes from a plurality of classifications based on the dynamic changing ride profile of the visitor 11. For instance, the plurality of classifications may include some classifications with conclusive status indicating that the unexpected changes may affect the experience of the visitor 11 in the environment 14, and particular actions may need to be done to avoid an undesired experience of the visitor 11 caused by the unexpected changes in the environment. The plurality of classifications may also include some classifications with optional status indicating that the unexpected changes may not affect the experience of the visitor 11 in the environment 14, and any action associated with the visitor 11 with respect to the unexpected changes may be unnecessary or optional. The predictive engine may provide recommendations to the system 10 based on the classifications. For instance, some unexpected changes may not be predicted to impact the visitor's overall experience in the environment 14 (e.g., classifications with optional status). When such predictions are dominant (e.g., selected or determined to be the likely outcome) providing instructions or requests that could damage a visitor's experience (e.g., asking the visitor 11 to exit the environment 14 or change route, or shutting down one or more elements in the environment 14) may be avoided. For example, in one embodiment, an alert may be transmitted for the visitor 11, which may request the visitor 11 to exit the environment 14 due to a hindrance that occurred in the environment 14, however, the predictive engine may determine that it is not necessary for the visitor 11 to exit the environment 14 and provide corresponding recommendations (e.g., providing the visitor 11 options to stay in the environment 14) for the visitor 11. On the other hand, some unexpected changes may be predicted to impact the visitor's overall experience in the environment 14 (e.g., classifications with conclusive status). When such predictions are dominant (e.g., selected or determined to be the likely outcome), certain instructions or requests that could damage a visitor's experience (e.g., asking the visitor 11 to exit the environment 14 or change route, or shutting down one or more elements in the environment 14) may be necessary and the predictive engine may provide corresponding recommendations for the visitor 11. For example, in the above illustrated example, the predictive engine may provide recommendations to confirm the request in the alert asking the visitor 11 to exit the environment 14.

Consequently, the recommendations may include instructions allowing actions that are not allowed or forbidden in the alert since the dynamic changing ride profile of the visitor 11 may be bigger or more relaxed compared to the one before conducting the predictive models. In some embodiments, the recommendations may be sent to the visitor 11 on the vehicle 12, and the visitor 11 may select an action recommended in the recommendations, which may not be allowed in the alert (e.g., continuing the route rather than changing the route or staying in the environment 14 rather than exiting). In some embodiments, one or more actions in the recommendations may be implemented by the system 10 automatically (e.g., the alert may request the system 10 to shut down one or more elements in the environment 14 but the recommendations may include actions requesting the system 10 not to shut down the one or more elements in the environment 14). By employing the predictive engine to evaluate the unexpected changes using predictive models, the visitor 11 may have a dynamic changing ride profile, which may be bigger or more relaxed compared to the one before conducting the predictive models. And the visitor 11 may have better experiences in the amusement parks.

Figure 4:
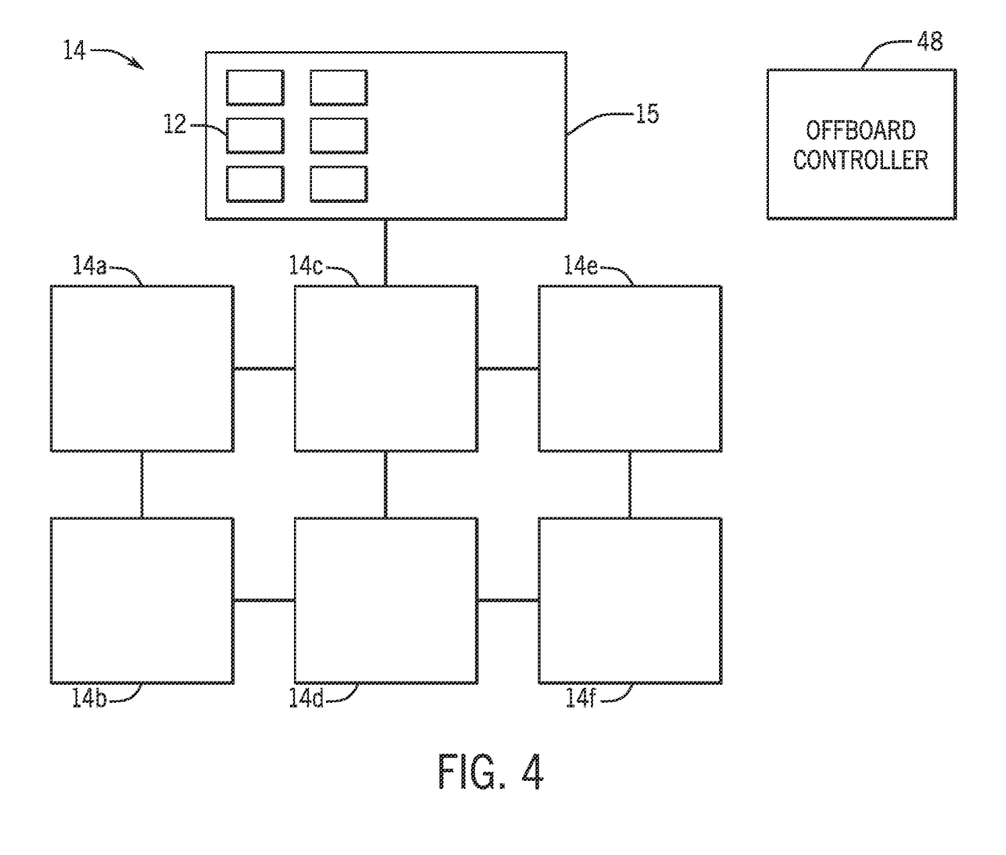
FIG. 4 is a block diagram of an embodiment of a riding environment, in accordance with an embodiment of the present disclosure.
Figure 5:
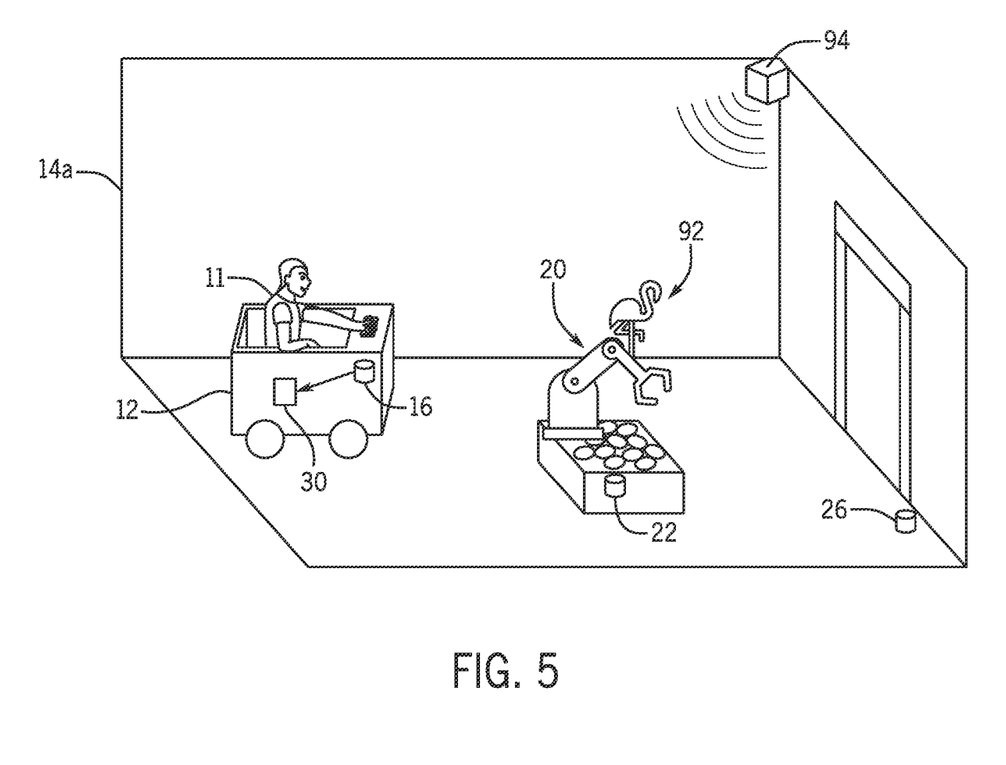
FIG. 5 is a block diagram of an embodiment of a ride vehicle in the riding environment of FIG. 4, in accordance with an embodiment of the present disclosure.

FIG. 4 and FIG. 5 illustrate an example of using the predictive engine in the environment 14. FIG. 4 is a block diagram of one embodiment of the environment 14, which has one or more attractions separated in different rooms. For instance, FIG. 4 illustrates six rooms in the environment 14. Specifically, the environment 14 in FIG. 4 includes a first room 14a, a second room 14b, a third room 14c, a fourth room 14d, a fifth room 14e, and a sixth room 14f. These six rooms may be cumulatively referred to as rooms 14a-f. Further, in the illustrated embodiment, the environment 14 includes an exit 15, which may be a parking place for the vehicle 12. The rooms 14a-f in the environment 14 may be connected, and the vehicle 12 may travel from one room to another. The offboard controller 48 may collect data from sensors distributed in the rooms 14a-f. Each room may be connected to one or more other rooms in the environment 14. In one embodiment, at least one room in the environment 14 may be connected to other places outside of the environment 14.

FIG. 5 is a perspective view of the visitor 11 riding the vehicle 12 through the room 14a, which is being monitored and analyzed with a predictive model in accordance with present embodiments. In the illustrated embodiment, the element 20 includes a robotic arm operable to move around in the environment 14 for entertainment purposes. An unexpected change to the element 20 may occur when an item 92 (e.g., an unexpected bird) flies into the environment 14 and lands on the element 20. The onboard sensor 16, the element sensor 22, and/or the offboard sensor 26 may detect the item 92 and send related information to the onboard controller 30 and/or the offboard controller 48.

The visitor 11 may have a ride profile associated with the room 14a and the unexpected change may be identified as interfering with the visitor's ride profile based on the lookup tables associated with the room 14a. In response to identifying this interference, an alert or instructions may be issued by the onboard controller 30 and/or the offboard controller 48, and sent to the room 14a (e.g., the room 14a may have a speaker 94), the vehicle 12, and/or the visitor 11, requesting the visitor 11 to exit the room 14a. The alert may trigger the onboard controller 30 and/or the offboard controller 48 to employ one or more predictive engines (e.g., predictive engines 44 and/or 58) to analyze the unexpected changes with the data collected by the sensors (e.g., the onboard sensor 16, the element sensor 22, the offboard sensor 26) and/or the external data (e.g., data about the visitor 11 on the vehicle 12, local weather/news) to evaluate conditions associated with the vehicle 12, the operations of the room 14a, or the operations of the element 20 in the room 14a. The predictive engine 44 and/or 58 may use one or more predictive models as described above and determine a dynamic changing ride profile for the visitor 11 in the room 14a. The predictive engine 44 and/or 58 may determine a classification from a plurality of classifications for the conditions of the visitor 11 based on the dynamic changing ride profile of the visitor 11 in the room 14a. For instance, the plurality of classifications may include some classifications indicating that the unexpected changes may affect the experience of the visitor 11 in the room 14a, and some classifications indicating that the unexpected changes may not or insubstantially affect the experience of the visitor 11. The plurality of classifications may also include some classifications indicating that the unexpected changes may affect the experience of the visitor 11 in the room 14a but may not affect the experience of the visitor 11 in other rooms of the environment 14 (e.g., the room 14b, the room 14c, the room 14d, the room 14f). The predictive engine may provide recommendations to the system 10 based on the classifications. For instance, some unexpected changes may not be predicted to impact or substantially impact the visitor's overall experience in the room 14a. When such predictions are dominant (e.g., selected or determined to be the likely outcome) providing instructions or requests that could damage a visitor's experience (e.g., asking the visitor 11 to exit the room 14a) may be avoided.

In an embodiment, the onboard controller 30 may provide recommendations more quickly than the offboard controller 48 due to less data transmission time needed for the onboard controller 30. Consequently, the onboard controller 30 may be used to provide the recommendations when timing is sensitive and real time data analysis may be beneficial. For example, it may take less time for the onboard controller 30 than the offboard controller 48 to provide recommendations suggesting that the visitor 11 not exit the room 14a, despite of the alert requesting the visitor 11 to exit the room 14a, when the item 92 is not identified as causing the undesired experience to the visitor 11. Accordingly, the experience of the visitor 11 in the room 14a may not be interrupted or not be interrupted for a longer time in the above example. On the other hand, the offboard controller 48 may provide more choices of recommendations or more accurate recommendations due to the offboard controller 48 having access to more data. For instance, the offboard controller 48 may receive data from all the rooms in the environment 14 (i.e., rooms 14a, 14b, 14c, 14d, 14e, and 14f) and may analyze the overall situations of the environment 14 to obtain more predictive outcomes as well as more accurate predictive outcomes. Accordingly, the offboard controller 48 may be used to provide more choices of recommendations or more accurate recommendations. For example, the offboard controller 48 may provide recommendations suggesting that the visitor 11 move to another room (e.g., room 14b, 14c, 14d, 14e, or 14f) rather than exiting the environment 14 (e.g., back to the exit 15) since the offboard controller 48 may be able to collect data from all rooms in the environment 14.

While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A controller for a ride system, the controller comprising:
   a processor; and
   a memory storing instructions that, when executed by the processor, cause the controller to perform operations comprising:
   accessing a data set indicative of conditions in an environment of the ride system in response to an alert indicative of a hindrance for the ride system;
   determining a classification from a plurality of classifications for the environment, via a predictive engine trained using supervised machine learning, based on the data set and a ride profile or envelope;
   determining one or more recommendations, via the predictive engine, based on the data set and the classification; and
   visually or audibly presenting the classification with the one or more recommendations.

2. The controller of claim 1, wherein the predictive engine is trained using the supervised machine learning based on a plurality of labelled data, wherein the plurality of labelled data is associated with the environment.

3. The controller of claim 1, wherein the plurality of classifications comprises an optional status and a conclusive status.

4. The controller of claim 1, wherein at least one of the one or more recommendations is forbidden based on the alert indicative of the hindrance, and wherein the hindrance is an environmental hindrance for the ride system.

5. The controller of claim 1, wherein the processor is located on a vehicle of the ride system.

6. The controller of claim 1, wherein the processor is configured to access the data set via a set of sensors.

7. The controller of claim 6, wherein the set of sensors is disposed in the environment.

8. A method of controlling a ride system, the method comprising:
   accessing, via a processor, a data set indicative of conditions in an environment in response to an indication of a hindrance for the ride system;
   determining a classification from a plurality of classifications for the environment, via a predictive engine trained using supervised machine learning, based on the data set and a ride envelope for the ride system;
   determining one or more recommendations, via the predictive engine, based on the data set and the classification; and
   presenting audibly or visually the classification with the one or more recommendations.

9. The method of claim 8, wherein the predictive engine is trained using the supervised machine learning based on a plurality of labelled data, wherein the plurality of labelled data is associated with the environment.

10. The method of claim 8, wherein the plurality of classifications comprises an optional status and a conclusive status.

11. The method of claim 8, wherein at least one of the one or more recommendations is forbidden based on the indication of the hindrance for the ride system being an environmental hindrance.

12. The method of claim 8, wherein the processor is located on a vehicle of the ride system.

13. The method of claim 8, wherein the processor is configured to access the data set via a set of sensors.

14. The method of claim 13, wherein the set of sensors is disposed in the environment.

15. A ride system, comprising:
   a ride vehicle configured to travel in an environment, wherein the ride vehicle comprises an onboard sensor configured to gather vehicle data from the ride vehicle;
   a dynamic element disposed within the environment;
   an offboard sensor disposed outside of the ride vehicle and configured to gather dynamic element data indicative of at least one aspect of the dynamic element; and a controller comprising one or more processors and a memory storing instructions that, when executed by the one or more processors, cause the controller to perform operations comprising:
  in response to an indication of a hindrance for the ride system, accessing a data set from the onboard sensor and the offboard sensor, the data set including the vehicle data and the dynamic element data;
  determining, based on the data set, a classification from a plurality of classifications for the environment via a predictive engine trained using supervised machine learning and a ride envelope of the ride system;
  determining one or more recommendations, via the predictive engine, based on the data set and the classification; and
  presenting the classification with the one or more recommendations.

16. The controller of claim 15, wherein the onboard sensor is configured to gather environment data from the environment of the ride system and the data set includes the environment data.

17. The controller of claim 15, wherein the dynamic element comprises path control equipment, an automated figure, maintenance equipment, or a combination thereof.

18. The controller of claim 15, wherein at least one of the one or more recommendations is forbidden based on the indication of the hindrance for the ride system.

19. The controller of claim 15, wherein the offboard sensor is integrated with the dynamic element.

20. The controller of claim 19, wherein the dynamic element comprises an automated figure configured to interact with the ride vehicle during an operation of the ride system.

* * * * *